Patented Nov. 16, 1943

2,334,566

UNITED STATES PATENT OFFICE 2,334,566

LUBRICATING OIL

Bert H. Lincoln, Ponca City, Okla., assignor, by mesne assignments, to The Lubri-Zol Development Corporation, Cleveland, Ohio, a corporation of Delaware No Drawing. Application March 11, 1940, Serial No. 323,381

2 Claims. (Cl. 252—48)

My invention relates to lubricating oils and more particularly to an improved lubricating oil of high film strength.

This is a continuation in part of my copending application, Serial No. 70,163, filed March 21, 1936.

Certain compounds are adsorbed or absorbed by metals forming tenacious films at the surface of metals which are able to stand high pressures. X-ray diffraction methods have shown that compounds containing highly polar molecules, that is, molecules of unsymmetrical electrical character containing an atom or group of atoms exhibiting a secondary or residual valence, tend to produce regimentation of the molecules of hydrocarbon oil when added thereto. A metal immersed in a strongly polar compound will show a film of the compound in which there is a regimentation of molecules oriented with respect to the surface of the metal by which they are adsorbed or absorbed.

In general, my invention contemplates a hydrocarbon oil having added thereto a small amount of an organometallic compound. The organometallic compounds may have an organic radical of the aliphatic or carbocyclic, or heterocyclic series. The metallic element of the compound may be any one of a number, of which the following are representative. For convenience, I shall list them in accordance with their occurrence in the periodic table:

Group I:
　Lithium
　Sodium
　Potassium
　Rubidium
　Caesium
Group II:
　Magnesium
　Zinc
　Cadmium
　Mercury
Group III:
　Boron
　Aluminum
　Thallium
Group IV:
　Silicon
　Tin
　Lead
Group V:
　Arsenic
　Bismuth
　Antimony
Group VI:
　Tellurium
　Selenium The compound may contain, in the organic radical or attached to the metal, an additional element or combination of elements including the halogens, sulfur, nitrogen, or oxygen.

The organometallic compounds of this invention have a dual action in a lubricant. One action involves increased load-carrying ability and/or oiliness, while another action is directed to the stability of the lubricant. For load-carrying capacity, quantities ranging from 0.1 percent to about 10.0 percent must be added. As an anticorrosive agent and/or an antisludging agent, much smaller amounts must be used ranging from approximately 0.001 to 0.1 percent. The action of the organometallic compounds is specific but difficult to understand. These compounds may be added to any type of hydrocarbon lubricants but show an unusual value in highly refined and solvent-treated lubricants.

In practice, it is better to employ compounds whose boiling point is above 100° C. in order that the addition compound will not be evaporated or distilled in use.

Preferred examples of various compounds which might be used according to groups of the periodic system are as follows:

Group I:
　Lithium isoamyl
　Lithium triphenylmethyl
　Sodium benzyl
　Sodium phenyl
　Sodium triphenylmethyl
　Potassium triphenylmethyl
　Rubidium triphenylmethyl
　Caesium triphenylmethyl
　Lithium chlorodibenzofurfuryl
　Sodium chlorophenoxyphenyl
　Potassium methoxychlorotriphenylmethyl
　Sodium chlorotriphenylmethyl sulfinate
Group II:
　Magnesium diphenyl
　Magnesium dipropyl
　Zinc di-isobutyl
　Zinc diphenyl
　Zinc dipropyl
　Zinc methyl ethylate
　Cresyl phenyl zinc
　Cadmium di-isoamyl
　Cadmium diphenyl
　Cadmium di-cresyl
　Mercury butyl isoamyl
　Mercury butyl phenyl
　Mercury dimesityl
　Mercury di-n-nitrophenyl
　Mercury diphenyl
　Mercury di-o-xylyl
　Mercury methyl phenyl
　Mercury phenyl benzyl
　Mercury phenyl mesityl
　Naphthyl mercuroiodide
　Phenyl mercury-2, 4-6,-trinitrophenyl N-propyl mercuric chloride
Di-tolyl mercury
Beryllium ethoxyethyl bromide
Chloromercuri-3, 4-diamylthiophene
Mercury chlorophenyl thienyl
Chlorophenylmercuric thiosulfate Group III:
   Boron phenyl dichloride
   Boron trimethyl
   Boron triphenyl
   O-xylyl-boron oxide
   Aluminum triphenyl
   Aluminum tripropyl
   Diethyl thallium acetate
   Diethyl thallium nitrate
   Diethyl thallium phosphate
   Diethyl thallium trichloroacetate
   Diphenyl thallium acetate
   Diphenyl thallium chloride
   Diphenyl thallium oxide
   Di-p-tolyl thallium chloride
   Di-beta-chloroethyl thallium phosphate
   Di-beta chloroethyl thallium trichloroacetate
   Di (p-methyl-o-mercaptophenyl) thallium chloride Group IV:
   Silicon tetraphenyl
   Triphenylgermane
   Triphenylgermanol
   Tin di-isoamyl
   Tin di-a-naphthyl
   Tin diphenyl
   Tin diphenyl amino-chloride
   Tin diphenyl dichloride
   Tin ethyl phenyl dichloride
   Tin isopropyl trichloride
   Tin tetrabenzyl
   Tin triethyl chloride
   Tin triphenyl
   Tin triphenyl chloride
   Lead di-isobutyl dibromide
   Lead diethyl isobutyl isoamyl
   Lead diethyl dichloride
   Lead diethyl diphenyl
   Lead diphenyl
   Lead diphenyl dichloride
   Lead diphenyl dinitrate
   Lead diphenyl oxide
   Diphenyl lead phosphate
   Lead diphenyl sulfide
   Lead tetraphenyl
   Lead triphenyl
   Lead triphenyl chloride
   Tin ethoxyethyl p-ethoxyphenyl dichloride
   Tin isopropoxyisopropyl trichloride
   Tin triethoxyethyl chloride
   Lead di-isobutoxyisobutyl dibromide
   Tin triamyl bromocamphorsulfonate
   Lead dichlorophenyl sulfide Group V:
   Ethyl-dichloroarsine
   Diphenylstibine chloride
   Triethylstibine
   Triphenylstibine
   Bismuth triethyl
   Di-a-naphthylchlorobismuthine
   Diphenyl chlorobismuthine
   Triphenyl bismuthine
   Dinaphthyl propyl bismuthine
   Diphenyl chlorobismuthine disulfonic acid
   Dithienyl chloroarsine Group VI:
   Tellurium diphenyl
   Tellurium diphenyl dichloride
   Selenium diphenyl The above series comprises a comprehensive list of compounds that may be used in practicing my invention; however, I have found that those compounds containing halogen and oxygen or halogen and sulphur give the best results.

The organometallic compounds have varying degrees of solubility in hydrocarbon oil. In some cases, it is necessary to use a solvent for the compound or to form colloidal suspensions of the compound in oil.

The film strengths of solid and semisolid greases may be improved by the addition of small amounts of organometallic compounds thereto. The chemical purity of organometallic compounds for use as extreme pressure addition agents is not critical. All that is important is that no corrosive contaminants be pesent. Mixtures of a number of organometallic compounds may be employed.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, I claim:

1. A lubricating oil comprising in combination a major proportion of a hydrocarbon oil and a minor proportion of a derivative of an organometallic compound having at least one carbon-metal bond and containing halogen and sulfur, both of which are in the organic radical.

2. A lubricating oil comprising in combination a major proportion of a hydrocarbon oil and a minor proportion of a derivative of an organometallic compound having at least one carbon-metal bond and containing chlorine and sulfur, both of which are in the organic radical.

BERT H. LINCOLN.